(12) United States Patent
Tseng

(10) Patent No.: US 11,835,772 B2
(45) Date of Patent: Dec. 5, 2023

(54) OPTICAL RECEPTACLE AND MODULE AND OPTICAL CONNECTOR MODULE USING THE SAME

(71) Applicant: Chung-Ming Tseng, Myau-Li County (TW)

(72) Inventor: Chung-Ming Tseng, Myau-Li County (TW)

(73) Assignee: ACSUPER TECHNOLOGIES INC., Myau-Li County (TW)

( * ) Notice: Subject to any disclaimer, the term of this patent is extended or adjusted under 35 U.S.C. 154(b) by 130 days.

(21) Appl. No.: 17/178,274

(22) Filed: Feb. 18, 2021

(65) Prior Publication Data

US 2021/0263225 A1    Aug. 26, 2021

(30) Foreign Application Priority Data

Feb. 20, 2020    (TW) .................................. 109105566

(51) Int. Cl.
    *G02B 6/38*      (2006.01)
(52) U.S. Cl.
    CPC ................................ *G02B 6/3825* (2013.01)
(58) Field of Classification Search
    CPC ...................................................... G02B 6/38
    USPC ......................................................... 385/139
    See application file for complete search history.

(56) References Cited

U.S. PATENT DOCUMENTS

| | | | | |
|---|---|---|---|---|
| 5,379,362 A | * | 1/1995 | Kawamura | G02B 6/3849 385/92 |
| 6,464,406 B1 | * | 10/2002 | Yarita | G02B 6/3825 385/60 |
| 9,470,855 B1 | * | 10/2016 | Shubin | H01L 33/58 |
| 9,698,564 B1 | * | 7/2017 | Shubin | H01S 5/026 |
| 10,795,100 B2 | * | 10/2020 | Leigh | G06F 1/185 |
| 2002/0150344 A1 | * | 10/2002 | Chiu | G02B 6/4292 385/88 |
| 2008/0113557 A1 | * | 5/2008 | Cox | H01R 13/6594 439/607.05 |
| 2008/0124951 A1 | * | 5/2008 | Cox | H01R 13/6315 439/65 |

(Continued)

FOREIGN PATENT DOCUMENTS

| | | | | |
|---|---|---|---|---|
| CA | 2221525 C | * | 1/2009 | .......... G02B 6/3807 |
| JP | H11509939 A | * | 8/1999 | |

(Continued)

*Primary Examiner* — Kaveh C Kianni

(57) ABSTRACT

The present invention provides an optical receptacle comprising a first side wall having a first series connecting structure, and a second side wall opposite to the first side wall and having a second series connecting structure. The first series connecting structure of one optical receptacle is coupled to the second assembling element of another optical receptacle along a first direction and is moved to an assembly position so as to form an optical receptacle module. Alternatively, the first series connecting structure of one optical receptacle is coupled to the second series connecting structure of another optical receptacle along a second direction and is moved to the assembly position so as to form the optical receptacle module. Alternatively, the optical receptacle module may be coupled to the different kinds of optical connectors to form an optical connector module.

31 Claims, 13 Drawing Sheets

(56) References Cited

U.S. PATENT DOCUMENTS

| | | | | |
|---|---|---|---|---|
| 2014/0151999 A1* | 6/2014 | Imaki | ............... | G02B 6/3814 285/308 |
| 2019/0094460 A1* | 3/2019 | Brusberg | ............... | G02B 6/403 |
| 2020/0049890 A1* | 2/2020 | Patel | ............... | G02B 6/4227 |

FOREIGN PATENT DOCUMENTS

| | | | | | |
|---|---|---|---|---|---|
| JP | 2018073683 | A | * | 5/2018 | |
| JP | 7013561 | B2 | * | 1/2022 | ............... G02B 6/36 |

* cited by examiner

OPTICAL RECEPTACLE AND MODULE AND OPTICAL CONNECTOR MODULE USING THE SAME

CROSS-REFERENCE TO RELATED APPLICATION

This application claims the benefit of Taiwan Patent Application No. 109105566, filed on Feb. 20, 2020, in the Taiwan Intellectual Property Office of the R.O.C, the disclosure of which is incorporated herein in its entirety by reference.

FIELD OF INVENTION

The present invention relates to a combination of optical connectors. In particular, it relates to an optical receptacle that may be combined in multiple directions to form a receptacle module in series, and an optical connector module using the same.

BACKGROUND OF THE INVENTION

Optical fibers have been widely used as signal transmission media in recent years due to the advantages of high frequency bandwidth and low loss. The use of optical fiber has already had a major revolutionary impact in the communications industry. Nowadays, 100 G optical module communication is not enough, and the future will be expected to move towards the era of 400 G optical module communications.

In the field of 400 G optical communications, there are also many designs for the packaging design of optical fiber modules, one of which is called Quad Small Form Factor Pluggable-Double Density (QSFF-DD). The specification, with a downward compatible design, has attracted the attention of many large manufacturers, and has launched corresponding specifications of optical communication module products.

Among some conventional technology, although they provide assembly of the receptacles, they can only be assembled in a single direction from top to bottom, so when it is to be disassembled, it must be also disassembled from the top to bottom. In this way of disassembly and assembly, if there are objects blocking in the disassembly direction, there would be a problem that it cannot be disassembled immediately. Although the blocked objects may be removed, it would still waste the time for the operation.

The above information disclosed in this section is only for enhancement of understanding of the background of the described technology and therefore it may contain information that does not form the prior art that is already known to a person of ordinary skill in the art.

SUMMARY OF THE INVENTION

The present invention provides an optical receptacle and module and an optical connector module using the same, which allows users to decide by themselves from a plurality of assembly directions, such as "up and down" directions or "front and back" directions. The appropriate assembly or disassembly direction may be chosen according to the use situation to assemble or disassemble multiple optical receptacles. Especially if there is an assembly method in "front and back" direction, when only a single element needs to be replaced, the receptacle that needs maintenance can be separately removed without disturbing the upper and lower installed elements. Therefore, the assembly method in "front and back" direction increases the convenience of maintenance and achieves the effect of short maintenance time.

The present invention provides an optical receptacle and module and an optical connector module using the same, and a rotating lock mechanism is arranged inside the optical receptacle to allow the connector to be coupled to the optical receptacle in a limited space to achieve the fixing effect. In addition, the receptacle body may be used for coupling to different types of connectors, such as a rotating-fixed type connector or a plug-in type connector, to provide users with different insertion methods and increase the flexibility of application.

In one embodiment of the present invention, the present invention provides an optical receptacle, comprising: a first side wall, having a first series connecting structure; and a second side wall, opposite to the first side wall and having a second series connecting structure, wherein after the first series connecting structure of the optical receptacle is coupled to the second series connecting structure of another optical receptacle in a first direction, the first series connecting structure of the optical receptacle is slid to an assembly position, so that the optical receptacle is combined with another optical receptacle; or after the first series connecting structure of the optical receptacle is coupled to the second series connecting structure of the another optical receptacle in a second direction, the first series connecting structure of the optical receptacle is slid to the assembly position, so that the optical receptacle is combined with the another optical receptacle.

In another embodiment of the present invention, the present invention also provides an optical receptacle module, comprising: a first optical receptacle, having a first side wall and a second side wall opposite to the first side wall, the first side wall having a first series connecting structure, and the second side wall having a second series connecting structure; and a second optical receptacle, having a third side wall and a fourth side wall opposite to the third side wall, the third side wall having a third series connecting structure, and the fourth side wall having a fourth series connecting structure, wherein after the first series connecting structure of the first optical receptacle is coupled to the fourth series connecting structure of the second optical receptacle in a first direction, the first series connecting structure of the first optical receptacle is slid to an assembly position, so that the first optical receptacle is combined with the second optical receptacle; or after the first series connecting structure of the first optical receptacle is coupled to the fourth series connecting structure of the second optical receptacle in a second direction, the first series connecting structure of the first optical receptacle is slid to the assembly position, so that the first optical receptacle is combined with the second optical receptacle.

In an advanced embodiment of the present invention, the present invention further provides an optical connector module, comprising: a first optical receptacle, having a first side wall and a second side wall opposite to the first side wall, the first side wall having a first series connecting structure, and the second side wall having a second series connecting structure; a second optical receptacle, having a third side wall and a fourth side wall opposite to the third side wall, the third side wall having a third series connecting structure, and the fourth side wall having a fourth series connecting structure; and a first optical connector, a first side of the first optical receptacle coupled to the first optical receptacle, or a third side of the second optical receptacle coupled to the second optical receptacle, wherein after the first series connecting structure of the first optical receptacle is coupled to the fourth series connecting structure of the second optical receptacle in a first direction, the first series connecting structure of the first optical receptacle is slid to an assembly position, so that the first optical receptacle is combined with the second optical receptacle; or after the first series connecting structure of the first optical receptacle is coupled to the fourth series connecting structure of the second optical receptacle in a second direction, the first series connecting structure of the first optical receptacle is slid to the assembly position, so that the first optical receptacle is combined with the second optical receptacle.

Many of the attendant features and advantages of the present invention will become better understood with reference to the following detailed description considered in connection with the accompanying drawings.

BRIEF DESCRIPTION OF THE DRAWINGS

The detailed structure, operating principle and effects of the present invention will now be described in more details hereinafter with reference to the accompanying drawings that show various embodiments of the present invention as follows.

DETAILED DESCRIPTION OF THE PREFERRED EMBODIMENTS

Figure 1B:
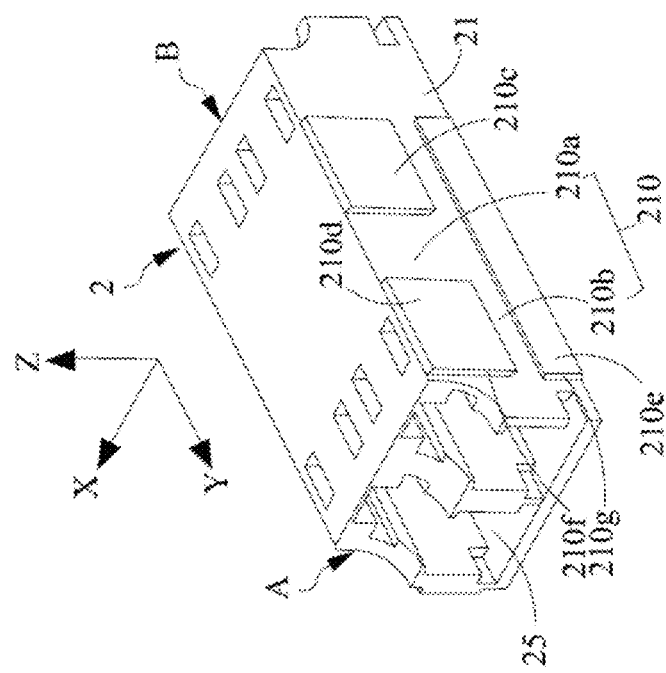
FIGS. 1A and 1B are schematic diagrams of different visual angle of an embodiment of the optical receptacle in the present invention.

Reference will now be made in detail to the exemplary embodiments of the present invention, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this invention will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way.

For convenience, certain terms employed in the specification, examples and appended claims are collected here. Unless defined otherwise, all technical and scientific terms used herein have the same meaning as commonly understood by one of the ordinary skill in the art to which this invention belongs.

Various embodiments will now be described more fully with reference to the accompanying drawings, in which illustrative embodiments are shown. The inventive concept, however, may be embodied in various different forms, and should not be construed as being limited only to the illustrated embodiments. Rather, these embodiments are provided as examples, to convey the inventive concept to one skilled in the art. Accordingly, known processes, elements, and techniques are not described with respect to some of the embodiments.

The singular forms "a", "and", and "the" are used herein to include plural referents unless the context clearly dictates otherwise.

The following descriptions are provided to elucidate an optical receptacle and module and an optical connector module using the same to aid it of skilled in the art in practicing this invention. These embodiments are merely exemplary embodiments and in no way to be considered to limit the scope of the invention in any manner.

Figure 1A:
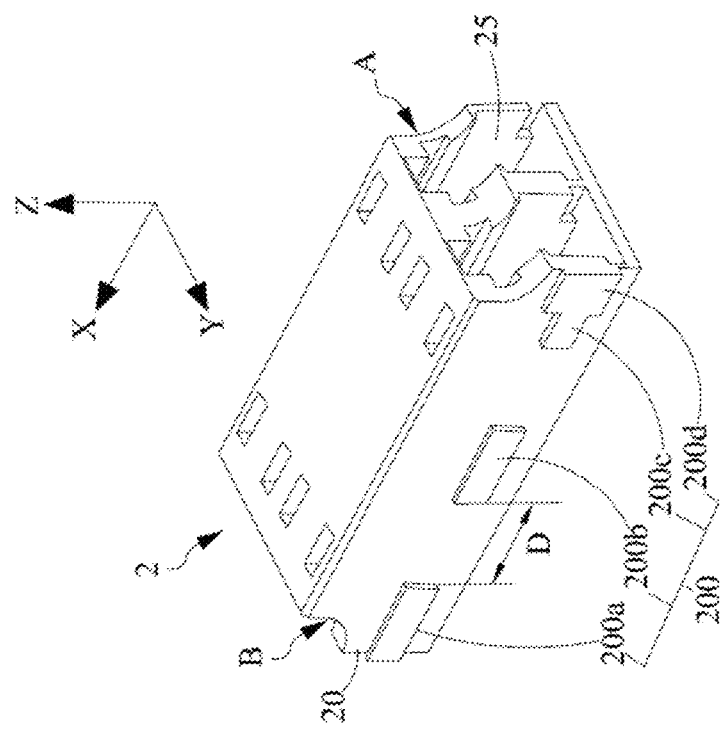

Please refer to FIGS. 1A and 1B, which are schematic diagrams of different visual angle of an embodiment of the optical receptacle in the present invention. In this embodiment, the optical receptacle 2 has a first side wall 20 and a second side wall 21, which are respectively formed at two sides of the optical receptacle 2 and parallel with each other. The first side wall 20 has a first series connecting structure 200, and a second series connecting structure 210 is disposed on the second side wall 21. The first series connecting structure 200 is connected to the second series connecting structure 210 of another optical receptacle to form a row of optical receptacles in series. Similarly, the second series connecting structure 210 may also be connected to the first series connecting structure 200 of another optical receptacle, so that the two optical receptacles 2 may be combined together. The combination way would be described later.

The first side A of the optical receptacle 2 has at least one insertion hole 25. Similarly, the second side B also has at least one insertion hole corresponding to insertion hole 25 of the first side A (not shown). In this embodiment, the first side A has two insertion holes 25, and the second side B has two corresponding insertion holes. Please refer to FIG. 1C, which is a schematic cross-sectional diagram of the optical receptacle in the present invention. The coupling structure 250 is disposed between insertion hole 25 of the first side A and the corresponding insertion hole 25a of the second side B. When the insertion hole 25 of the first side A has an inserted connector, the connector is coupled to an end portion 250a of the coupling structure 250 in the insertion hole 25. Similarly, when the insertion hole 25a of the second side B is inserted by a connector, the connector is coupled to another end portion 250b of the coupling structure 250 in another insertion hole 25a.

Figure 1D:
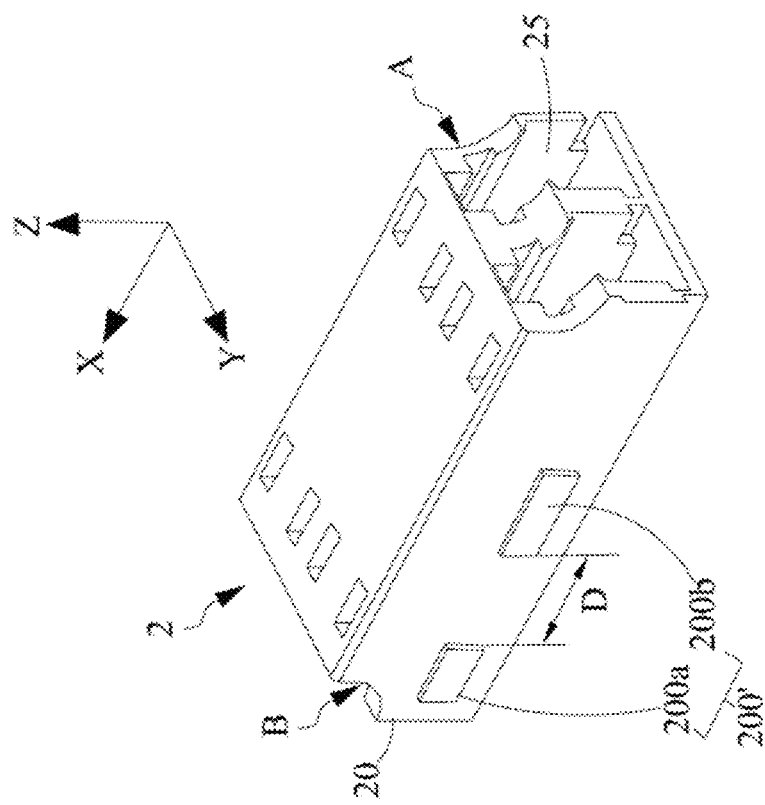
FIGS. 1D and 1E are schematic diagrams of different visual angle of another embodiment of the optical receptacle in the present invention.
Figure 1C:
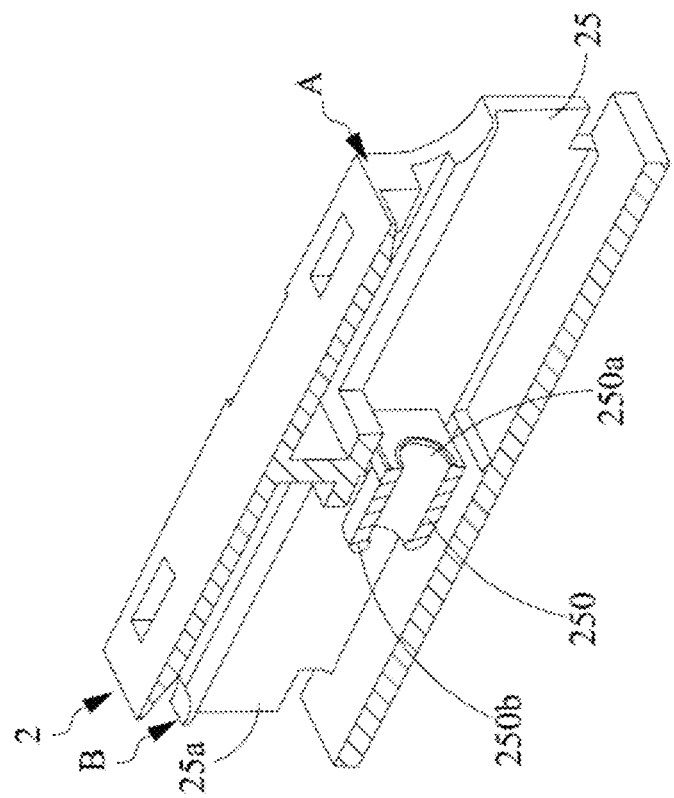
FIG. 1C is a schematic cross-sectional diagram of the optical receptacle in the present invention.
Figure 1E:
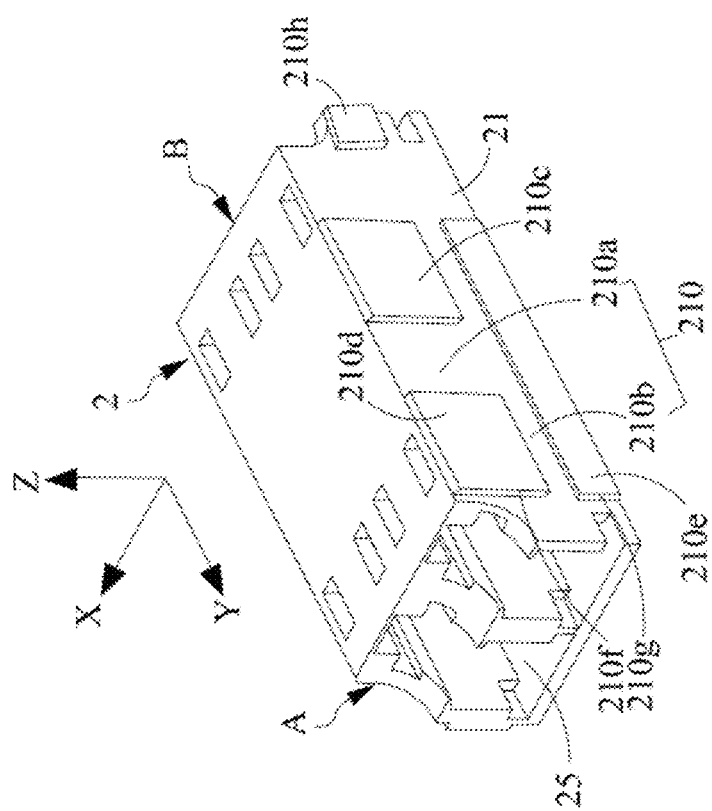

Returning to FIGS. 1A and 1B, in an embodiment, the first series connecting structure 200 further has a plurality of convex portions 200a-200c arranged along the second direction (X-axis). An end of the convex portion 200a further has a first stopper convex portion 200d located on a first side of the first side wall 20. There is a distance D between adjacent convex portions 200a to 200c. The second series connecting structure 210 further has a first sliding groove 210a arranged along the first direction (Z-axis) and a second sliding groove 210b connected to the first sliding groove 210a and arranged along the second direction (X-axis). In this embodiment, the first sliding groove 210a and the second sliding groove 210b are defined by convex blocks 210c to 210e. It should be noted that the design of the convex portion and the stopper convex portion are not limited to the embodiments shown in FIGS. 1A and 1B. For example, in another embodiment, as shown in FIGS. 1D and 1E, which are schematic diagrams of different visual angle of another embodiment of the optical receptacle in the present invention. In this embodiment, it is basically similar to FIGS. 1A and 1B. The difference is that the convex portions 200a-200b are disposed in this embodiment, and the stopper convex portion 210h is disposed at the end of the second side wall 21.

Figure 2A:
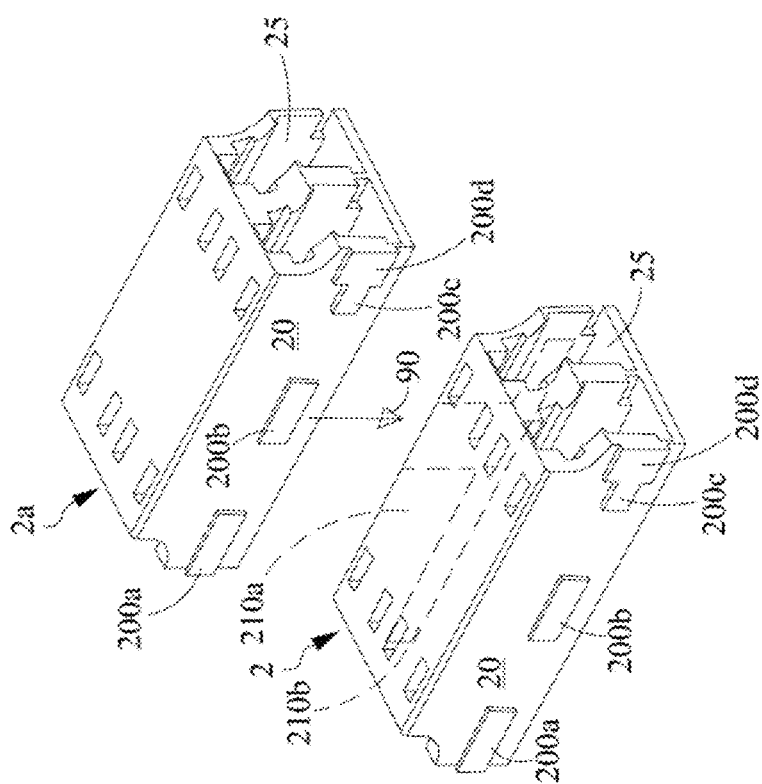
FIGS. 2A to 2C are schematic diagrams of an embodiment of the combination of multiple optical receptacles in the present invention.
Figure 2C:
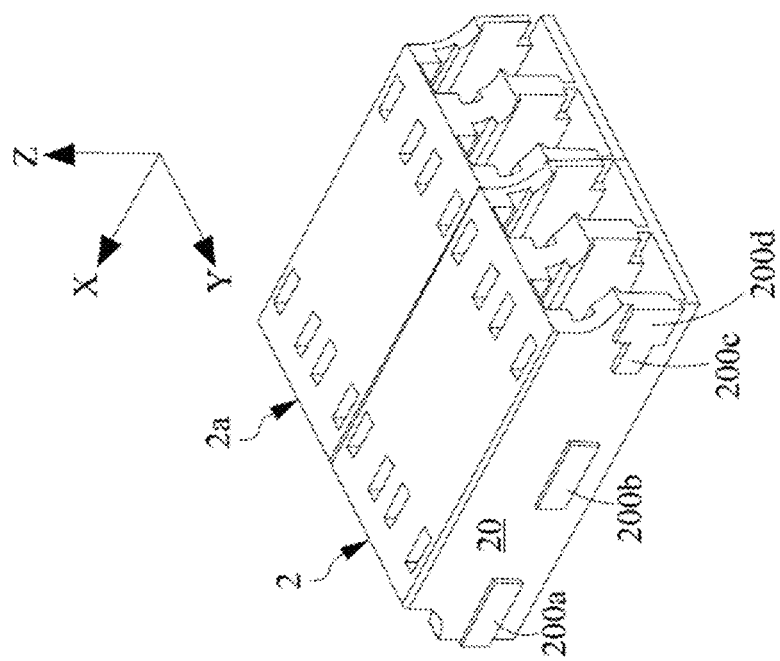
Figure 2B:
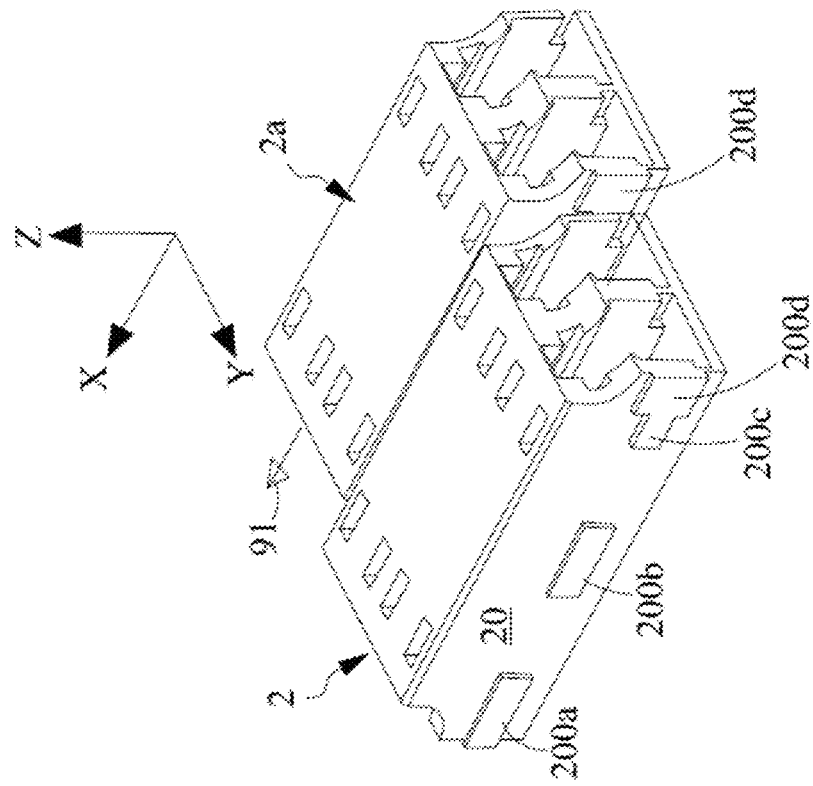

Next, the method of combining multiple optical receptacles 2 is going to be explained. Please refer to FIGS. 2A to 2C, which are schematic diagrams of an embodiment of the combination of multiple optical receptacles in the present invention. In this embodiment, the convex portion 200b of the optical receptacle 2a is aligned with the first sliding groove 210a of the optical connector 2, and then the optical receptacle 2a slides down in the first direction (Z-axis), which is indicated by the direction of the arrow 90, so that the convex portion 200b and the first sliding groove 210a are slidably connected together. When the optical receptacle 2a slides to an intermediate position along the first direction (Z-axis), as shown in FIG. 2B, that is, when an edge of the convex portion 200b of the optical receptacle 2a is leaned against the convex block 210e of the optical receptacle 2, the optical receptacle 2a is moved along the second direction (X-axis), which is indicated by the direction of the arrow 91, the optical receptacle 2a is moved to an assembly position, as shown in FIG. 2C, that is, the combination of the optical receptacle 2a and the optical receptacle 2 is completed. In this embodiment, the assembly position refers to the position where the stopper convex portion 200d of the optical receptacle 2a is leaned against the lateral sides 210f and 210g of the convex blocks 210e and 210d of the optical receptacle 2. It should be noted that the aforementioned movement to the intermediate position is not a required limitation. For example, in the embodiments of FIGS. 1D and 1E, the convex portion 200b of one of the optical receptacle 2 is combined with the first sliding groove 210a of another optical receptacle 2, and the convex portion 200a is slidably connected between the stopper convex portion 210h and the convex portion 210c. In this embodiment, the optical receptacle 2 is just slid in the first direction (Z-axis) to directly reach the assembly position.

Figure 3B:
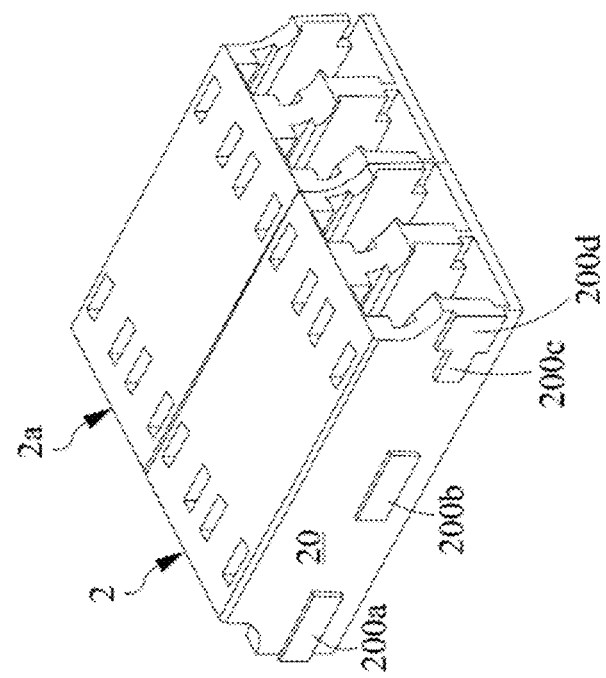
FIGS. 3A and 3B are diagrams of another embodiment of the combination of multiple optical receptacles in the present invention.
Figure 3A:
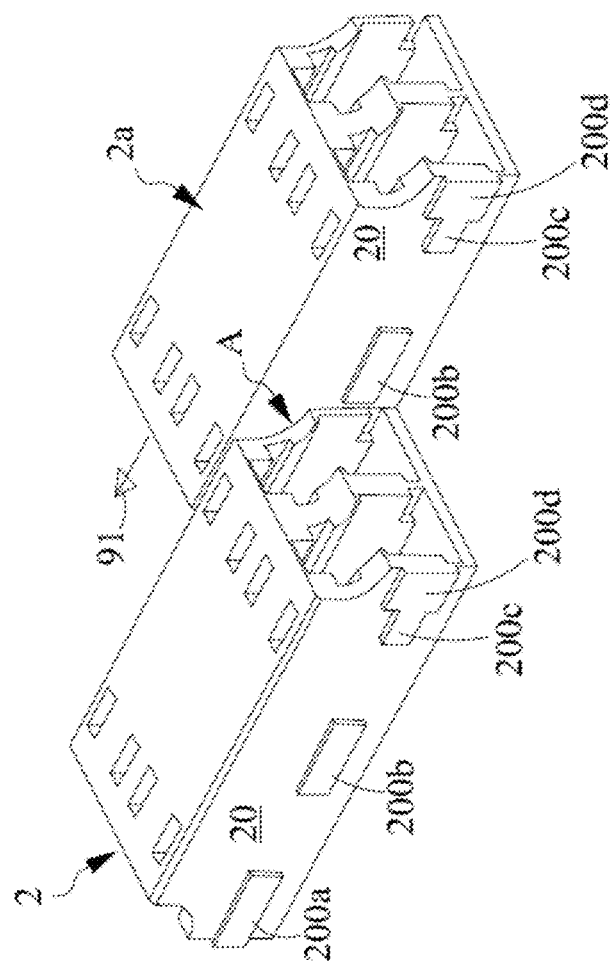

Please refer to FIGS. 3A and 3B, which are diagrams of another embodiment of the combination of multiple optical receptacles in the present invention. This embodiment is different from the aspect shown in FIGS. 2A to 2C. In this embodiment, the convex portion 200a of the optical receptacle 2a is directly aligned with the second sliding groove 210b of the optical connector 2 on the first side A, and then the optical receptacle 2a is moved along the second direction (X-axis), that is, in the direction indicated by the arrow 91, the optical receptacle 2a is directly moved to the assembly position, as shown in FIG. 3B, which completes the combination of the optical receptacle 2a and the optical receptacle 2. It should be noted that, in this embodiment, the assembly position means that, as shown in FIGS. 2A to 2C, the position where the stopper convex portion 200d of the optical receptacle 2a is leaned against the lateral sides 210f and 210g of the convex blocks 210e and 210d of the optical receptacle 2.

Figure 4B:
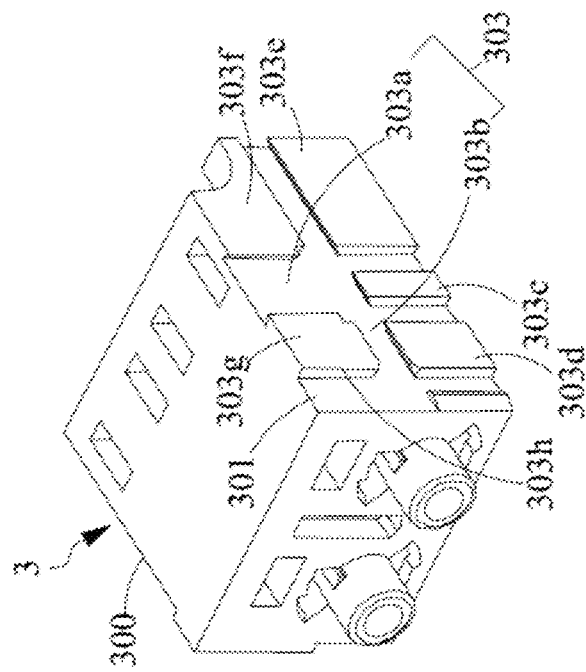
FIGS. 4A and 4B are three-dimensional schematic diagrams of another embodiment of the optical receptacle in the present invention.
Figure 4A:
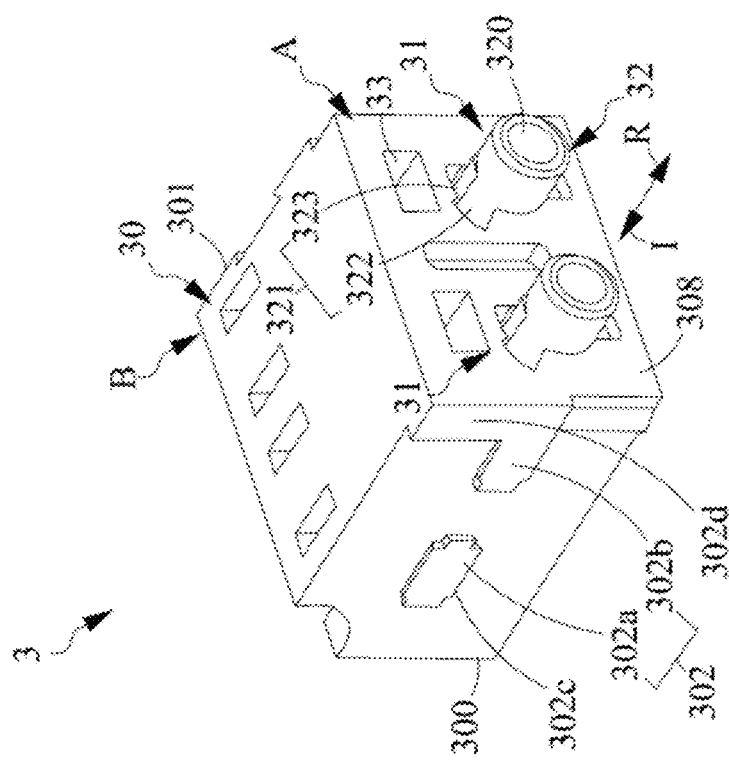

Please refer to FIGS. 4A and 4B, which are three-dimensional schematic diagrams of another embodiment of the optical receptacle in the present invention. The optical receptacle 3 includes a receptacle body 30, a first side A of the receptacle body 30 has at least one coupling portion 31, and each coupling portion 31 has a first connecting structure 32. In this embodiment, the first connecting structure 32 has a terminal coupling portion 320 and a pair of positioning grooves 321. An end of the terminal coupling portion 320 protrudes from the surface 308 of the first side A of the receptacle body 30, and another end of the terminal coupling portion 320 extends inside the receptacle body 30 toward the second side B. The positioning grooves 321 are respectively formed on both sides of the terminal coupling portion 320, and each positioning groove 321 further has an insertion groove 322 and a fixing groove 323, which is disposed on a side of the insertion groove 322.

Figure 5B:
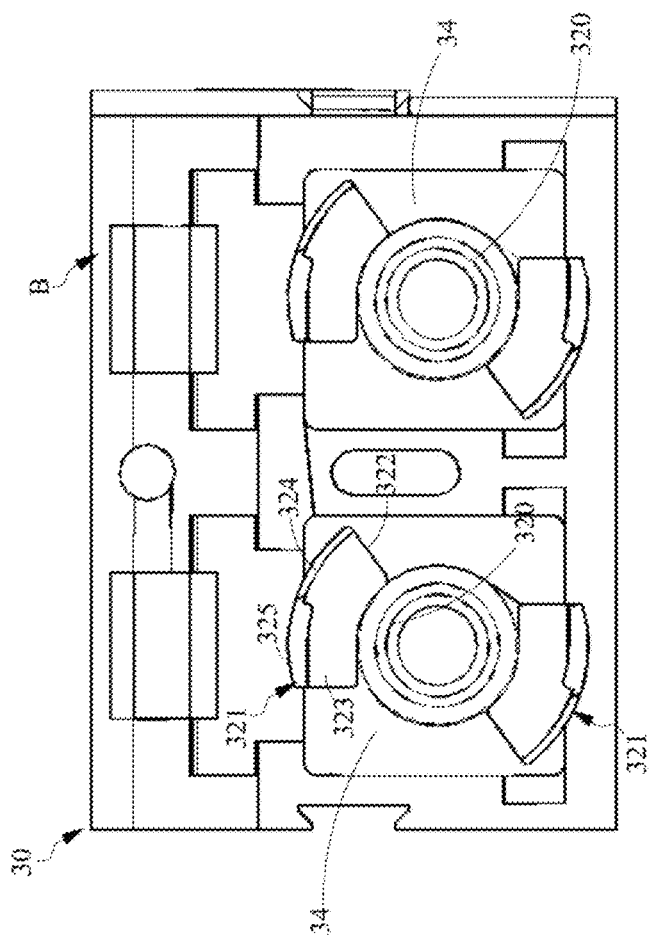
FIG. 5B is a schematic side view of another embodiment of the receptacle body of FIG. 4A illustrated from the visual angle of the second side B.
Figure 5A:
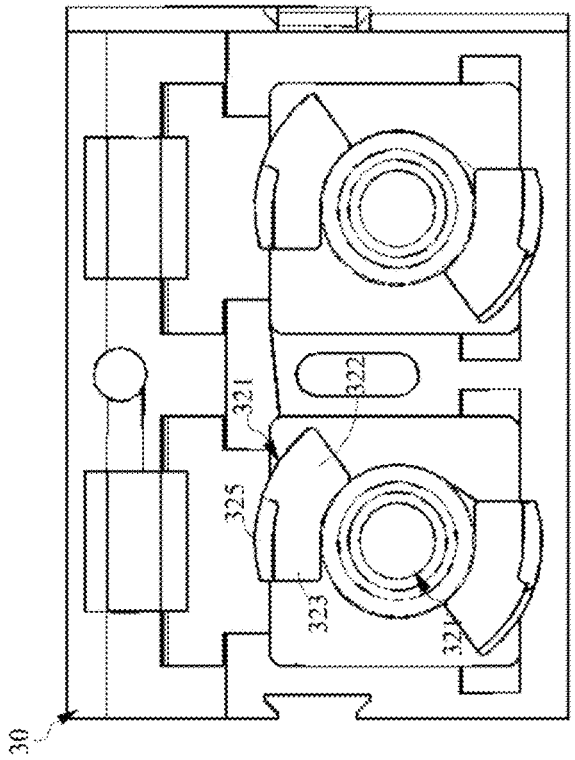
FIG. 5A is a schematic side view of an embodiment of the receptacle body of FIG. 4A illustrated from the visual angle of the second side B.

Please refer to FIG. 5A, which is a schematic side view of an embodiment of the receptacle body of FIG. 4A illustrated from the visual angle of the second side B. In this embodiment, the fixing groove 323 has a stopper 325, and its function is to restrain the movement of the connector in the drawing direction (R) opposite to the insertion direction (I) after the connector is inserted. The detailed operation way would be described later. In another embodiment, as shown in FIG. 5B, the insertion groove 322 has a restraining member 324 for restraining the rotation of the connector after the connector is coupled and fixed to the receptacle body 30. The detailed operation would be described later.

Returning to FIGS. 4A and 4B, the coupling portion 31 further has a second connecting structure 33 formed on a side of the first connecting structure 32 to allow another type of connector with a fixing member to insert into the second connecting structure 33, the effect of positioning and fixing the connector is achieved, and the detailed operation way would be described later. Through the design of the coupling portion 31 of the receptacle body 30 in the embodiment of FIG. 4A, the receptacle body 30 allows different types of connector to couple with it. The first type of connector is coupled to the receptacle body 30 along the insertion direction (I), and then the connector is fixed with the receptacle body 30 by rotation to achieve the fixing effect. The second type of connector is directly coupled to the receptacle body 30 without rotation along the insertion direction (I), and after the second connecting structure 33 is directly coupled to a fixing member on a connector body, the fixing effect is achieved.

Next, the combination of the optical receptacle 3 is going to be explained. In the embodiment of FIG. 4A, the receptacle body 30 of the optical receptacle 3 has a first side wall 300 and a second side wall 301 opposite to the first side wall 300. The first side wall 300 has a first series connecting structure 302, and the second side wall 301 has a second series connecting structure 303. The first series connecting structure 302 is connected to the second series connecting structure 303 of another optical receptacle to form a row of optical receptacles in series. In this embodiment, through the first series connecting structure 302 and the second series connecting structure 303, the first side wall 300 of one receptacle body 30 is attached to the second side wall 301 of another receptacle body, and they are moved to be assembled together.

Figure 6B:
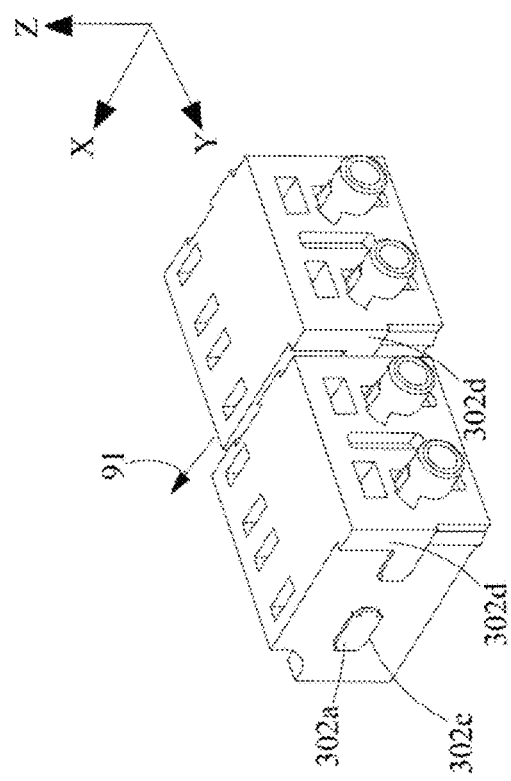
FIGS. 6A to 6C are a schematic diagrams of an embodiment of the combination of multiple optical receptacles in the present invention.
Figure 6A:
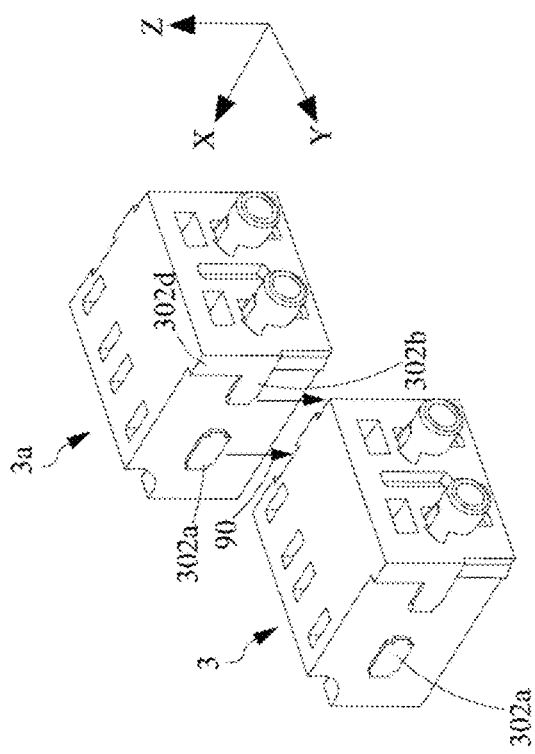
Figure 6C:
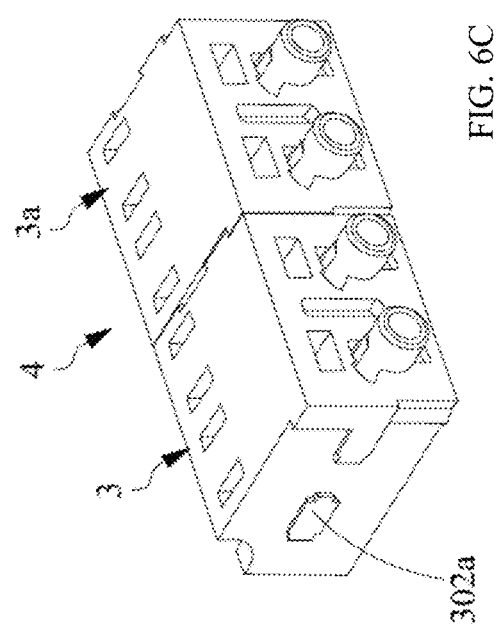

In this embodiment, the first series connecting structure 302 has a plurality of protruding connecting structures 302a-302b, and the second series connecting structure 303 has concave structures 303a-303b that match with the protruding connecting structures 302a-302b. A plurality of convex blocks 303c-303g are disposed adjacent to the concave structures 303a-303b. There are two ways for combination. The first way is shown in FIGS. 6A to 6C. The related reference numeral may refer to FIGS. 4A and 4B. In the embodiment of FIGS. 6A to 6C, the convex portion 302a of the optical receptacle 3a is aligned with the convex structure 303a of the optical connector 3, and then the optical receptacle 3a slides down in the first direction (Z-axis), which is indicated by the direction of the arrow 90, so that the convex portion 302a and the concave structure 303a are slidably connected together. When the optical receptacle 3a slides to an intermediate position along the first direction (Z-axis), as shown in FIG. 6B, that is, when an edge 302c of the convex portion 302b of the optical receptacle 3a is leaned against the convex block 303c of the optical receptacle 3, the optical receptacle 3a is moved along the second direction (X-axis), which is indicated by the direction of the arrow 91, the optical receptacle 3a is moved to an assembly position, as shown in FIG. 6C, that is, the combination of the optical receptacle 3a and the optical receptacle 3 is completed. It should be noted that, in this embodiment, the assembly position refers to the position where the stopper convex portion 302d connected by the convex portion 302b of the optical receptacle 3a is leaned against the lateral side 303h of the convex block 303d of the optical receptacle 3.

Figure 7B:
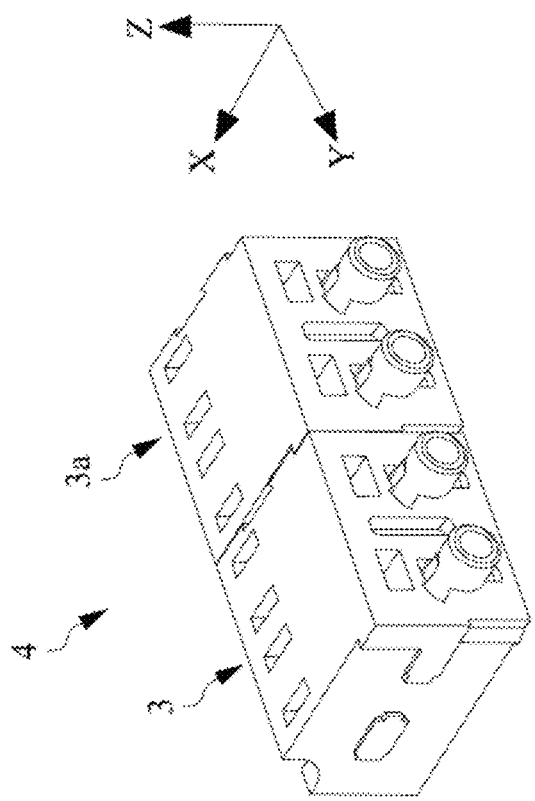
FIGS. 7A and 7B are schematic diagrams of another embodiment of the combination of multiple optical receptacles in the present invention.
Figure 7A:
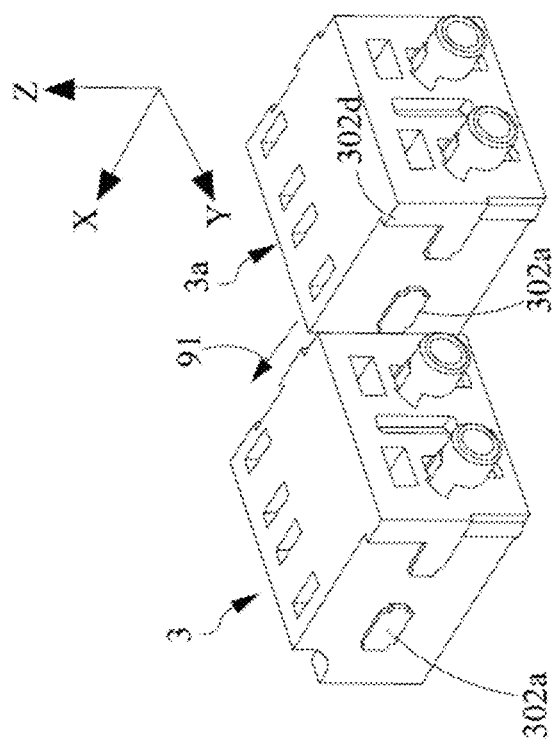

Please refer to FIGS. 4A to 4B and FIGS. 7A to 7B, which are schematic diagrams of another embodiment of the combination of multiple optical receptacles in the present invention. This embodiment is different from the aspect shown in FIGS. 6A to 6C. In this embodiment, the convex portion 302a of the optical receptacle 3a is directly aligned with the concave structure 303b of the optical connector 3 on the first side A, and then the optical receptacle 3a is moved along the second direction (X-axis), that is, in the direction indicated by the arrow 91, the optical receptacle 3a is directly moved to the assembly position, as shown in FIG. 7B, which completes the combination of the optical receptacle 3a and the optical receptacle 3. It should be noted that, in this embodiment, the assembly position means that, as shown in FIG. 4B, the position where the stopper convex portion 302d of the optical receptacle 3a is leaned against the lateral side 303e of the convex block 303d of the optical receptacle 3. Using the combination in multiple directions of the present invention, a plurality of optical receptacles may be connected in series to form an optical receptacle module 4 as shown in FIG. 8A for combining with different optical connectors.

Figure 8A:
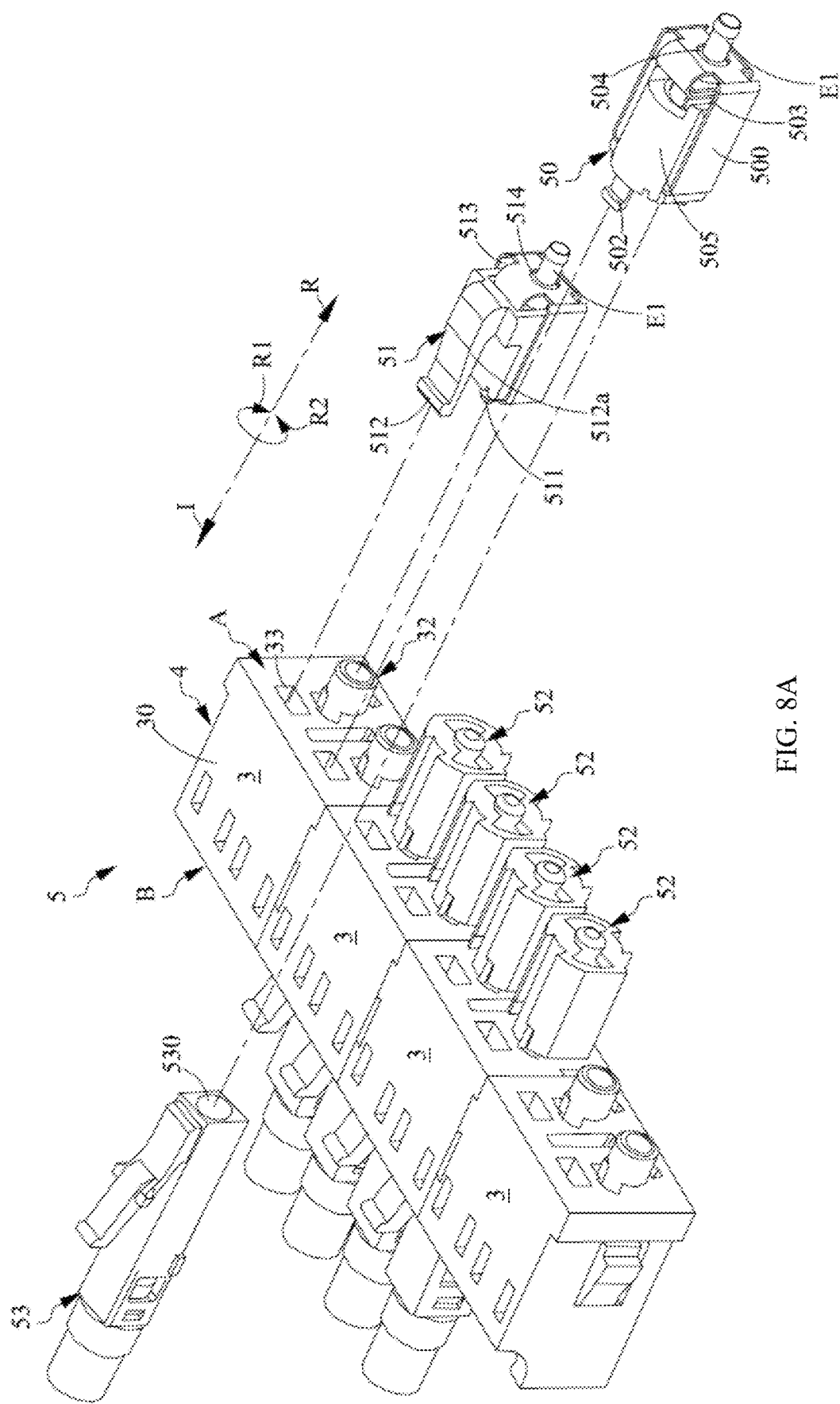
FIG. 8A is a three-dimensional diagram of an embodiment of an optical connector module in the present invention.
Figure 8B:
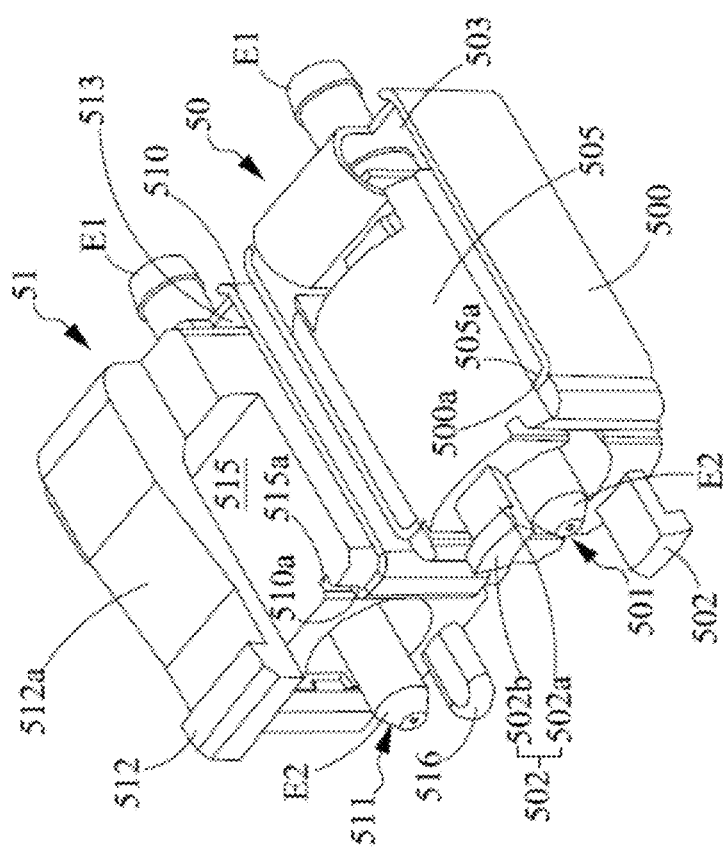
FIG. 8B is a schematic diagram of an embodiment of the optical connector in the present invention.

Please refer to FIGS. 8A and 8B, in which FIG. 8A is a three-dimensional diagram of an embodiment of an optical connector module, and FIG. 8B is a schematic diagram of an embodiment of the optical connector in the present invention. In this embodiment, the optical connector module 5 includes an optical receptacle module 4 combined by a plurality of combined optical receptacles 3 and a plurality of optical connectors 50-53. The optical receptacle module 4 may be combined by the aforementioned different types of receptacles. In this embodiment, the optical receptacles 3 is employed from FIGS. 4A and 4B for combination. The optical connector 50 is a micro connector, but it is not limited thereto. The optical connector 50 has a first supporting frame 500 and a rotating base 505 in this embodiment. The first supporting frame 500 has a first recess 503 and a first through hole 504, which allows a first end E1 of the first terminal portion 501 to pass through. The rotating base 505 is disposed into the first recess 503 and connected to the first supporting frame 500. In this embodiment, two sides of the rotating base 505 have opening slots 505a, and an end of the first supporting frame 500 has an embedding portion 500a for embedding into the corresponding opening slot 505a, so that the rotating base 505 may be fixed with the first supporting frame 500.

The first terminal portion 501 is disposed into the rotating base 505, which has a first positioning structure 502 corresponding to the surface of the first connecting structure 32. In this embodiment, the first positioning structures 502 are respectively formed on two sides of the second end E2 of the first terminal portion 501 and correspond to the positioning groove 321. The first positioning structure 502 of this embodiment has a cantilever 502a protruding from an end surface of the rotating base 505, and a block structure 502b is disposed at an end of the cantilever 302a. When the optical connector 50 is coupled to the first connecting structure 32, the second end E2 of the first terminal portion 501 is coupled to the terminal coupling portion 320.

Figure 9A:
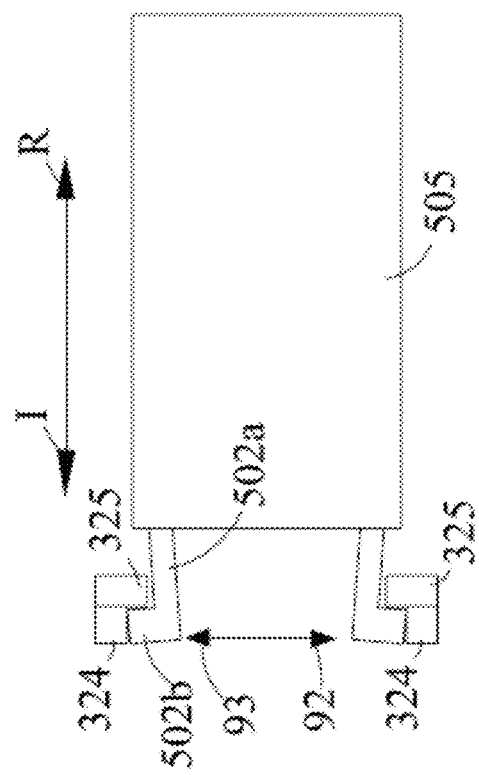
FIGS. 9A to 9D are schematic diagrams of assembling the optical connector and the first connecting structure in the present invention.
Figure 9B:
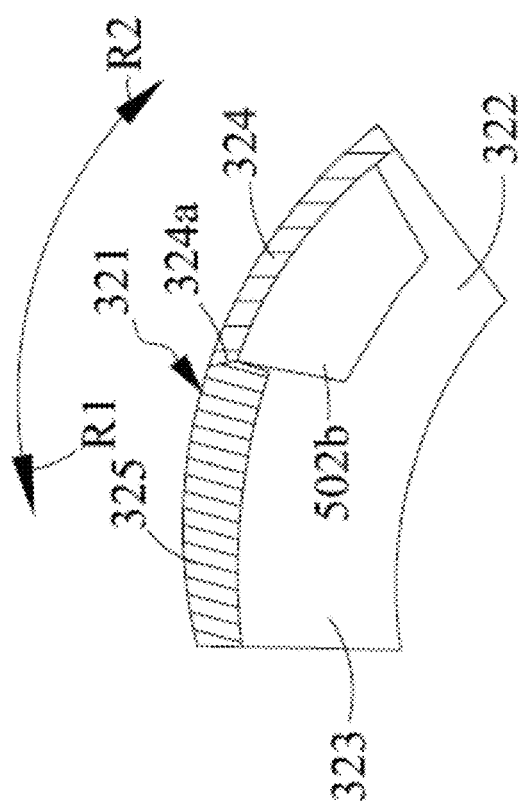

Please refer to FIGS. 9A to 9D, which are schematic diagrams of assembling the optical connector and the first connecting structure in the present invention. The positioning groove in this embodiment is the same as the positioning groove shown in FIG. 5B. When assembled, as shown in FIGS. 9A and 9B, the first positioning structure 502 of the optical connector 50 passes through the insertion groove 322 of the corresponding positioning groove 321 along the insertion direction (I). Because the restraining member 324 is protruded from the wall edge of the insertion groove 322, the block structure 502b on the first positioning structure 502 is pressed by the restraining member 324 to generate a force in the direction of the axis of the rotating base 505. Since the cantilever 502a has a certain length, the force makes the cantilever deformed and a flexible restoring force is accumulated, so that the block structure 502b generates a displacement movement in the axial direction 92 of the rotating base 505.

Figure 9C:
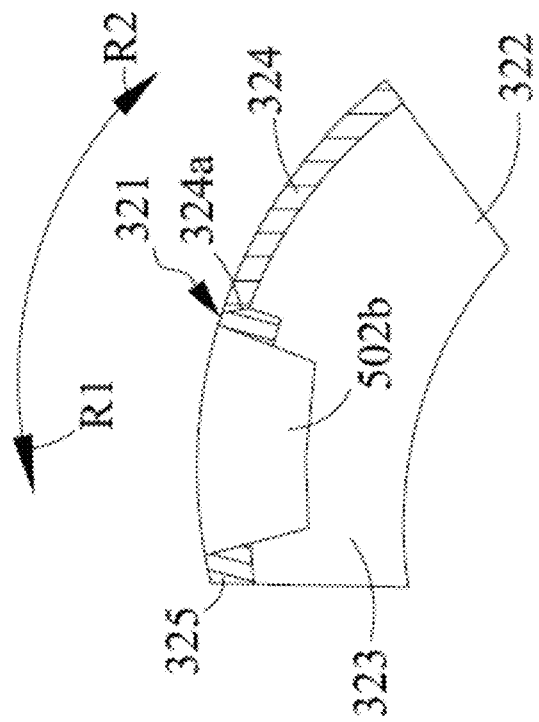
Figure 9D:
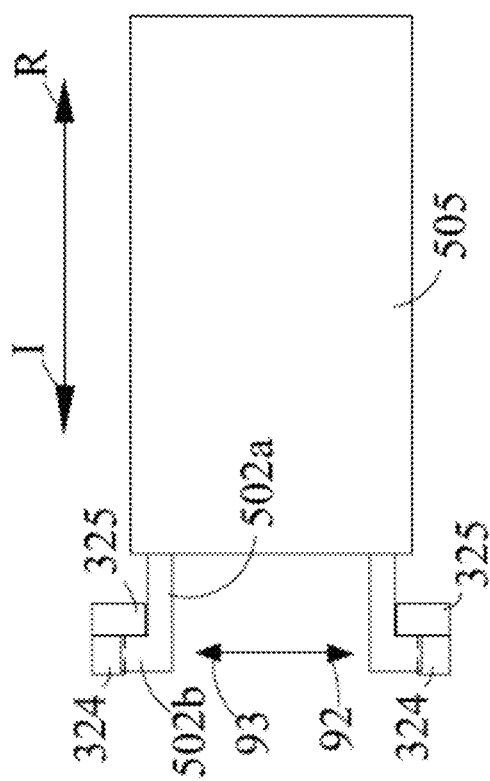

At this time, the rotating force in the rotating direction R1 is applied to the rotating base 505 so that the rotating base 505 rotates toward the fixing groove 323. As shown in FIGS. 9C and 9D, as the rotating base 505 rotates, the block structure 502b would escape the compression of the restraining member 324 and enter into the fixing groove 323. Since there is no restraining member 324 in the fixing groove 323, the block structure 502b is no longer compressed by the restraining member 324, and the accumulated flexible restoring force is released without restraint, so that the cantilever 502a rebounds to the original position in another direction 93. In addition, a stopper 325 protrudes from the wall edge of the fixing groove 323 to block the block structure 502b in the fixing groove 323, so that when the optical connector 50 is located in the fixing groove 323, it would not be pulled out by the force from the drawing direction (R). In addition, it should be noted that since a thickness 324a is protruded from the restraining member 324 in the insertion groove 322 adjacent to the fixing groove 323. During operation, the thickness 324a of the restraining member 324 may also generate the restraining effect on the optical connector 50 in the rotation direction R2.

When the optical connector 50 is taken away from the receptacle body 30, as long as a rotation force opposite to the rotation direction R2 is applied to the rotation base 505, the rotation force allows the block structure 502b to overcome the protruding thickness 324a of the restraining member 324, and the block structure 502b rotates from the fixing groove 323 to the insertion groove 322 under the rotation force. At this time, the user may apply a force in the drawing direction (R) to pull the optical connector 50 away from the receptacle body 30.

Please refer to FIGS. 8A and 8B, the receptacle body 30 in this embodiment allows another type of optical connector 51 to be coupled to the receptacle body 30 without changing the structure of the receptacle body 30. In this embodiment, the difference from the optical connector 50 is that the optical connector 51 moves linearly along the insertion direction (I) to couple to the receptacle body 30, and also moves linearly along the drawing direction (R) to detach from the receptacle body 30. The optical connector 51 has a second terminal portion 511, a second supporting frame 510 and a seat body 515. The second supporting frame 510 has a second recess 513 and a second through hole 514, which allows the first end E1 of the second terminal portion 511 to pass through.

The seat body 515 is disposed into the second recess 513 and connected to the second supporting frame 510. In this embodiment, the seat body 515 has an assembly groove 515a for combining with the embedding portion 510a at the end of the second supporting frame 510, so that the seat body 515 may be fixed on the second supporting frame 510. A second terminal portion 511 is disposed into the seat body 515. In addition, a fixing member 512 is formed on the surface of the seat body 515. When the second end E2 of the second terminal portion 511 is coupled to the terminal coupling portion 320 of the first connecting structure 32 of the corresponding coupling portion 31, the fixing member 512 is embedded into the corresponding second connecting structure 33. In order to enhance the fixing effect between the optical connector 51 and the receptacle body 30, an end of the seat body 515 of the optical connector 51 further has a second positioning structure 516. When the optical connector 51 is coupled to the coupling portion 31, the second positioning structure 316 is coupled to one of the positioning grooves 321. In this embodiment, the second positioning structure 516 is coupled to the positioning groove 321 under the terminal coupling portion 320. Since the fixing member 512 also has the cantilever 512a, when the optical connector 51 is to be taken away from the receptacle body 30, the cantilever 512a is pressed, so that the fixing member 512 is disconnected from the second connecting structure 33, and the optical connector 51 may be taken away from the receptacle body 30. It should be noted that the first supporting frame 500 and the second supporting frame 510 of the aforementioned optical connectors 50 and 51 are not necessary components. In another embodiment, please refer to FIG. 8A, the optical connector 52 does not have the first supporting frame 500.

Returning to FIGS. 5A, 4B and 2B, the aforementioned optical connectors 50 and 51 are coupled to the coupling portion 31 of the first side A of the receptacle body 30, the second side B of the receptacle body 30 has an insertion hole 34 corresponding to the coupling portion 31, and a terminal coupling portion 320 corresponding to the first connecting structure 32 is disposed into the insertion hole 34. In this embodiment, the terminal coupling portion 320 extends from the first side A of the receptacle body 30 to the inside of the receptacle body 30. Each insertion hole 34 allows an optical connector 53 to be inserted into the receptacle body 30. Each optical connector 53 has a through hole 530 that is coupled to the terminal coupling portion 320 in the receptacle body 30, so that the optical connector 53 is electrically connected to the optical connector 50, 51, or 52. In one embodiment, an LC connector may be considered as the optical connector 53, but it is not a limited herein.

In summary, the present invention provides an optical receptacle and module and an optical connector module using the same, which allows users to choose an appropriate assembling or disassembling direction according to the use situation to connect a plurality of optical receptacles for assembly or disassembly. In this way, when there is only a single element to be replaced, the receptacle that needs maintenance can be removed separately, without disturbing the effect of the elements that have been installed, the convenience of maintenance can be increased, and the effect of short maintenance time can also be achieved.

It will be understood that the above description of embodiments is given by way of example only and that various modifications may be made by those with ordinary skill in the art. The above specification, examples, and data provide a complete description of the present invention and use of exemplary embodiments of the invention. Although various embodiments of the invention have been described above with a certain degree of particularity, or with reference to one or more individual embodiments, those with ordinary skill in the art could make numerous alterations or modifications to the disclosed embodiments without departing from the spirit or scope of this invention.

What is claimed is:
1. An optical receptacle, comprising:
a first side wall, having a first series connecting structure; and
a second side wall, opposite to the first side wall and having a second series connecting structure,
wherein the optical receptacle has two assembly directions, after the first series connecting structure of the optical receptacle is coupled to the second series connecting structure of another optical receptacle in a first direction, the first series connecting structure of the optical receptacle is slid to an assembly position; or after the first series connecting structure of the optical receptacle is coupled to the second series connecting structure of the another optical receptacle in a second direction, the first series connecting structure of the optical receptacle is slid to the assembly position,
wherein the first series connecting structure has a plurality of convex portions arranged along the second direction, and an end of the convex portion located on a first side of the first side wall has a stopper convex portion.

2. The optical receptacle of claim 1, wherein the second series connecting structure has a first sliding groove arranged along the first direction and a second sliding groove connected to the first sliding groove and arranged along the second direction.

3. The optical receptacle of claim 1, wherein the optical receptacle has a first side and a second side opposite to the first side, and the first side has a first insertion hole, and the second side has a second insertion hole.

4. The optical receptacle of claim 1, wherein the optical receptacle has a first side, which has at least one coupling portion, the coupling portion has a first connecting structure, the first connecting structure comprises:
a terminal coupling portion; and
a pair of positioning grooves, respectively formed at two sides of the terminal coupling portion, wherein the positioning groove has an insertion hole and a fixing groove disposed at a side of the insertion hole.

5. The optical receptacle of claim 4, wherein the insertion hole has a first stopper for restraining a rotation of a first connector coupled to the first connecting structure.

6. The optical receptacle of claim 4, wherein the fixing groove has a second stopper for restraining a movement of a first connector coupled to the first connecting structure in a drawing direction opposite to an insertion direction.

7. The optical receptacle of claim 4, wherein after a first positioning structure of a first connector is inserted into the insertion groove in an insertion direction, the first positioning structure is embedded into the fixing groove by rotation.

8. The optical receptacle of claim 4, wherein the coupling portion has a second connecting structure formed on a side of the first connecting structure to allow a fixing member of a second connector to be inserted into the second connecting structure.

9. The optical receptacle of claim 1, wherein after the first series connecting structure of the optical receptacle is coupled to the second series connecting structure of the another optical receptacle in the first direction, the first series connecting structure of the optical receptacle is moved to an intermediate position, and then slid to the assembly position.

10. An optical receptacle module, comprising:
a first optical receptacle, having a first side wall and a second side wall opposite to the first side wall, the first side wall having a first series connecting structure, and the second side wall having a second series connecting structure; and
a second optical receptacle, having a third side wall and a fourth side wall opposite to the third side wall, the third side wall having a third series connecting structure, and the fourth side wall having a fourth series connecting structure,
wherein the first optical receptacle and the second optical receptacle have two assembly directions, after the first series connecting structure of the first optical receptacle is coupled to the fourth series connecting structure of the second optical receptacle in a first direction, the first series connecting structure of the first optical receptacle is slid to an assembly position; or after the first series connecting structure of the first optical receptacle is coupled to the fourth series connecting structure of the second optical receptacle in a second direction, the first series connecting structure of the first optical receptacle is slid to the assembly position,
wherein the first series connecting structure has a plurality of convex portions arranged along the second direction, and an end of the convex portion located on a first side of the first side wall has a stopper convex portion; the third series connecting structure has a plurality of convex portions arranged along the second direction, and an end of the convex portion located on a first side of the first side wall has a stopper convex portion.

11. The optical receptacle module of claim 10, wherein the second series connecting structure has a first sliding groove arranged along the first direction and a second sliding groove connected to the first sliding groove and arranged along the second direction, and the fourth series connecting structure has a third sliding groove arranged along the first direction and a fourth sliding groove connected to the first sliding groove and arranged along the second direction.

12. The optical receptacle module of claim 10, wherein the first optical receptacle has a first side and a second side opposite to the first side, the first side has a first insertion hole, and the second side has a second insertion hole; the second optical receptacle has a third side and a fourth side opposite to the third side, the third side has a third insertion hole, and the fourth side has a fourth insertion hole.

13. The optical receptacle module of claim 10, wherein a first side of the first optical receptacle and a third side of the second optical receptacle respectively have at least one coupling portion, the coupling portion has a first connecting structure, the first connecting structure comprises:
a terminal coupling portion; and
a pair of positioning grooves, respectively formed at two sides of the terminal coupling portion, wherein the positioning groove has an insertion hole and a fixing groove disposed at a side of the insertion hole.

14. The optical receptacle module of claim 13, wherein the insertion hole has a first stopper for restraining a rotation of a first connector coupled to the first connecting structure.

15. The optical receptacle module of claim 13, wherein the fixing groove has a second stopper for restraining a movement of a first connector coupled to the first connecting structure in a drawing direction opposite to an insertion direction.

16. The optical receptacle module of claim 13, wherein after a first positioning structure of a first connector is inserted into the insertion groove in an insertion direction, the first positioning structure is embedded into the fixing groove by rotation.

17. The optical receptacle module of claim 13, wherein the coupling portion has a second connecting structure formed on a side of the first connecting structure to allow a fixing member of a second connector to be inserted into the second connecting structure.

18. The optical receptacle module of claim 10, wherein after the first series connecting structure is coupled to the second series connecting structure of the another optical receptacle in the first direction, the first series connecting structure is moved to an intermediate position, and then slid to the assembly position.

19. An optical connector module, comprising:
a first optical receptacle, having a first side wall and a second side wall opposite to the first side wall, the first side wall having a first series connecting structure, and the second side wall having a second series connecting structure;
a second optical receptacle, having a third side wall and a fourth side wall opposite to the third side wall, the third side wall having a third series connecting structure, and the fourth side wall having a fourth series connecting structure; and
a first optical connector, a first side of the first optical receptacle coupled to the first optical receptacle, or a third side of the second optical receptacle coupled to the second optical receptacle,
wherein the first optical receptacle and the second optical receptacle have two assembly directions, after the first series connecting structure of the first optical receptacle is coupled to the fourth series connecting structure of the second optical receptacle in a first direction, the first series connecting structure of the first optical receptacle is slid to an assembly position; or after the first series connecting structure of the first optical receptacle is coupled to the fourth series connecting structure of the second optical receptacle in a second direction, the first series connecting structure of the first optical receptacle is slid to the assembly position,
wherein the first series connecting structure has a plurality of convex portions arranged along the second direction, and an end of the convex portion located on a first side of the first side wall has a stopper convex portion; the third series connecting structure has a plurality of convex portions arranged along the second direction, and an end of the convex portion located on a first side of the first side wall has a stopper convex portion.

20. The optical connector module of claim 19, wherein the second series connecting structure has a first sliding groove arranged along the first direction and a second sliding groove connected to the first sliding groove and arranged along the second direction, and the fourth series connecting structure has a third sliding groove arranged along the first direction and a fourth sliding groove connected to the first sliding groove and arranged along the second direction.

21. The optical connector module of claim 19, wherein the first optical receptacle has a first side and a second side opposite to the first side, the first side has a first insertion hole, and the second side has a second insertion hole; the second optical receptacle has a third side and a fourth side opposite to the third side, the third side has a third insertion hole, and the fourth side has a fourth insertion hole.

22. The optical connector module of claim 19, wherein a first side of the first optical receptacle and a third side of the second optical receptacle respectively have at least one coupling portion, the coupling portion has a first connecting structure, the first connecting structure comprises:
a terminal coupling portion; and
a pair of positioning grooves, respectively formed at two sides of the terminal coupling portion, the positioning groove has an insertion hole and a fixing groove disposed at a side of the insertion hole.

23. The optical connector module of claim 22, wherein the insertion hole has a first stopper for restraining a rotation of a first connector coupled to the first connecting structure.

24. The optical connector module of claim 22, wherein the fixing groove has a second stopper for restraining a movement of a first connector coupled to the first connecting structure in a drawing direction opposite to an insertion direction.

25. The optical connector module of claim 22, wherein after a first positioning structure of a first connector is inserted into the insertion groove in an insertion direction, the first positioning structure is embedded into the fixing groove by rotation.

26. The optical connector module of claim 25, wherein the first connector comprises:
a rotating base, a first terminal portion accommodated in the rotating base, and having the first positioning structure corresponding to a surface of the first connecting structure,
wherein the first connector is coupled to the first connecting structure, the first terminal portion is coupled to the terminal coupling portion.

27. The optical connector module of claim 26, wherein the coupling portion has a second connecting structure formed on a side of the first connecting structure to allow a fixing member of a second connector to be inserted into the second connecting structure.

28. The optical connector module of claim 27, wherein the second connector comprises:
a second terminal portion;
a second supporting frame, having a second recess and a second through hole, which allows a first end of the second terminal portion to pass through; and
a seat body, disposed into the second recess and connected to the second supporting frame, the second terminal portion disposed into the seat body, the fixing member is formed on a surface of the seat body,
wherein when the second connector is coupled to one of the coupling portion, a second end of the second terminal portion is coupled to the terminal coupling portion of the coupling portion of the corresponding second connector.

29. The optical connector module of claim 28, wherein a second positioning structure is disposed at a side of the rotating base of the second connector, when the second connector is coupled to the coupling portion, the second positioning structure is coupled to one of the positioning grooves.

30. The optical connector module of claim 26, wherein the rotating base has a first supporting frame, which has a first recess for accommodating the rotating base.

31. The optical connector module of claim 19, wherein after the first series connecting structure is coupled to the second series connecting structure of the another optical receptacle in the first direction, the first series connecting structure is moved to an intermediate position, and then slid to the assembly position.

\* \* \* \* \*